US012147190B2

(12) United States Patent
Kawanami et al.

(10) Patent No.: US 12,147,190 B2
(45) Date of Patent: Nov. 19, 2024

(54) IMAGE FORMING APPARATUS

(71) Applicant: CANON KABUSHIKI KAISHA, Tokyo (JP)

(72) Inventors: Takeo Kawanami, Kanagawa (JP); Akinori Mitsumata, Tokyo (JP); Takehiro Miyashita, Kanagawa (JP); Katsuhiko Oba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/156,935

(22) Filed: Jan. 19, 2023

(65) Prior Publication Data

US 2023/0176521 A1 Jun. 8, 2023

Related U.S. Application Data

(63) Continuation of application No. 17/553,268, filed on Dec. 16, 2021, now Pat. No. 11,586,143.

(30) Foreign Application Priority Data

Dec. 23, 2020 (JP) ................................ 2020-213835

(51) Int. Cl.
*G03G 15/20* (2006.01)
*G03G 15/08* (2006.01)
*G03G 21/20* (2006.01)

(52) U.S. Cl.
CPC ....... *G03G 21/206* (2013.01); *G03G 15/0868* (2013.01); *G03G 15/2017* (2013.01); *G03G 15/2064* (2013.01)

(58) Field of Classification Search
CPC .................................................... G03G 21/206
See application file for complete search history.

(56) References Cited

U.S. PATENT DOCUMENTS 11,269,266 B2 * 3/2022 Kobayashi ......... G03G 15/0856
11,366,407 B2 * 6/2022 Cho ....................... G03G 21/12
(Continued)

FOREIGN PATENT DOCUMENTS

CN 1763654 A 4/2006
CN 1782926 A 6/2006
KR 20070075606 A * 7/2007

*Primary Examiner* — Sevan A Aydin
(74) *Attorney, Agent, or Firm* — Canon U.S.A., Inc. I.P. Division

(57) ABSTRACT

An image forming apparatus includes a photosensitive drum, a development device, a fixing device, an apparatus main body, and a fan including a rotating shaft that extends in a longitudinal direction of the photosensitive drum and a blade around the rotating shaft. The development device develops a toner image on the photosensitive drum. The fixing device fixes the toner image from the photosensitive drum to a recording material. The apparatus main body is provided with a discharge port from which the toner-fixed recording material is discharged. A length of the fan rotating shaft in the longitudinal direction is longer than a diameter of a rotational trajectory of the blade. The fan is provided on a downstream side of the fixing device in a discharge direction in which the recording material is discharged from the discharge port and overlaps a part of the development device when viewed in a vertical direction.

14 Claims, 8 Drawing Sheets

(56) References Cited

U.S. PATENT DOCUMENTS

| | | | | |
|---|---|---|---|---|
| 2006/0216058 A1* | 9/2006 | Penke | G03G 15/5016 | |
| | | | 399/107 | |
| 2013/0027737 A1* | 1/2013 | Suzuki | G03G 15/5016 | |
| | | | 358/1.14 | |
| 2013/0051882 A1* | 2/2013 | Yang | G03G 21/12 | |
| | | | 399/360 | |
| 2015/0309435 A1* | 10/2015 | Kuroyama | G03G 9/08782 | |
| | | | 430/105 | |
| 2021/0318645 A1* | 10/2021 | Oba | G03G 15/0865 | |

* cited by examiner

X
Z
90
91b
93
Lw
A
B
91
92
95
96
94
B–B
Dw
91a
92a
97
A–A

Z
X
Pa
Pb
P
96
97
97a
97b
91
A
A
Dw
97
A–A

IMAGE FORMING APPARATUS

CROSS-REFERENCE TO RELATED APPLICATIONS

The present application is a continuation of U.S. patent application Ser. No. 17/553,268, filed on Dec. 16, 2021, which claims priority from Japanese Patent Application No. 2020-213835 filed Dec. 23, 2020, which are hereby incorporated by reference herein in their entireties.

BACKGROUND

Field

The present disclosure relates to an image forming apparatus provided with a cooling fan for sending air.

Description of the Related Art

Some conventional image forming apparatuses such as printers and copy machines adopting an electrophotographic method are provided with a cooling fan for sending air. In such image forming apparatuses, a louver is formed on an exterior member so that outside air can be taken in the inside of the image forming apparatus by the fan.

The outside air taken in is guided by a duct to cool various units arranged inside the image forming apparatus and a sheet to be conveyed inside the apparatus. Some types of fans cool various units and sheets by sending air inside the image forming apparatus to the outside.

According to Japanese Patent Application Laid-Open No. 2016-218333, an image forming apparatus is discussed which is provided with a cross flow fan extending in a rotating axis direction of a photosensitive drum. The cross flow fan can send air to a wide area in a width direction of a sheet and thus cool many areas at once. The cross flow fan discussed in Japanese Patent Application Laid-Open No. 2016-218333 includes a fan main body having a plurality of blades around a shaft and a housing that houses the fan main body, and a plurality of air outlet ports are formed in the housing. The housing can be rotated with respect to the fan main body to change an air blowing direction.

The cross flow fan discussed in Japanese Patent Application Laid-Open No. 2016-218333 is arranged above a fixing device at a position between a discharge path in which a sheet having passed through the fixing device is guided to a discharge tray and a reverse conveying path in which the sheet passes during double-sided printing. An air blowing destination is usually directed toward the discharge path and the reverse conveying path to cool the sheet being conveyed. In a case where both ends of a heating roller are excessively heated by continuous conveyance of small size sheets, the air blowing destination is partly changed toward the fixing device by rotating the housing.

According to Japanese Patent Application Laid-Open No. 2016-218333, the fan is arranged at a position suitable for cooling the fixing device and a sheet being conveyed, but the fan is located away from a development device that stores toner, so that a temperature around the development device tends to rise. Therefore, it is necessary to extend a duct from the fan to a cartridge or to additionally provide another fan for cooling the surroundings of the development device to suppress temperature rise. However, both methods lead to increase in size and cost of the apparatus.

SUMMARY

The present disclosure is directed to a technique for preventing temperature rise around a development device while suppressing increase in size and cost of an apparatus.

According to an aspect of the present disclosure, an image forming apparatus includes a photosensitive drum, a development device configured to develop a toner image on the photosensitive drum, a fixing device configured to fix the toner image transferred from the photosensitive drum to a recording material, an apparatus main body provided with a discharge port from which the recording material to which the toner image is fixed is to be discharged, and a fan including a rotating shaft that extends in a longitudinal direction of the photosensitive drum and a blade around the rotating shaft, wherein a length of the rotating shaft of the fan in the longitudinal direction is longer than a diameter of a rotational trajectory of the blade, and wherein the fan is provided on a downstream side of the fixing device in a discharge direction in which the recording material is discharged from the discharge port and overlaps a part of the development device when viewed in a vertical direction.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings. It should be noted that dimensions, materials, and shapes of components described in the exemplary embodiments and their relative arrangements are to be appropriately changed depending on a configuration of an apparatus to which the present disclosure is applied or various conditions. Thus, the scope of the present disclosure is not limited only to the exemplary embodiments described below.

Overall Configuration of Image Forming Apparatus

A first exemplary embodiment is described below. An overall configuration of an image forming apparatus 1 according to the present exemplary embodiment is described. The image forming apparatus 1 according to the present exemplary embodiment is a monochrome laser beam printer adopting an electrophotographic process and forms an image on a recording material P using developer (toner) based on image information transmitted from an external device such as a personal computer. Examples of the recording material P include a recording sheet, a label sheet, an overhead projector (OHP) sheet, and a cloth.

In the following description, a height direction (a direction opposite to a vertical direction) of the image forming apparatus 1 in a case where the image forming apparatus 1 is placed on a horizontal surface is defined as a Z direction. A direction that intersects with the Z direction and is parallel to a rotating axis direction of a photosensitive drum 21 which is described below, i.e., a main scanning direction, is defined as an X direction. A direction that intersects with the X direction and the Z direction is defined as a Y direction. It is desirable that the X direction, the Y direction, and the Z direction perpendicularly intersect with each other. For convenience sake, the positive side and the negative side in the X direction are respectively referred to as a right side and a left side. The positive side and the negative side in the Y direction are respectively referred to as a front side and a rear or rear surface side. The positive side and the negative side in the Z direction are respectively referred to as an upper side and a lower side.

Figure 1:
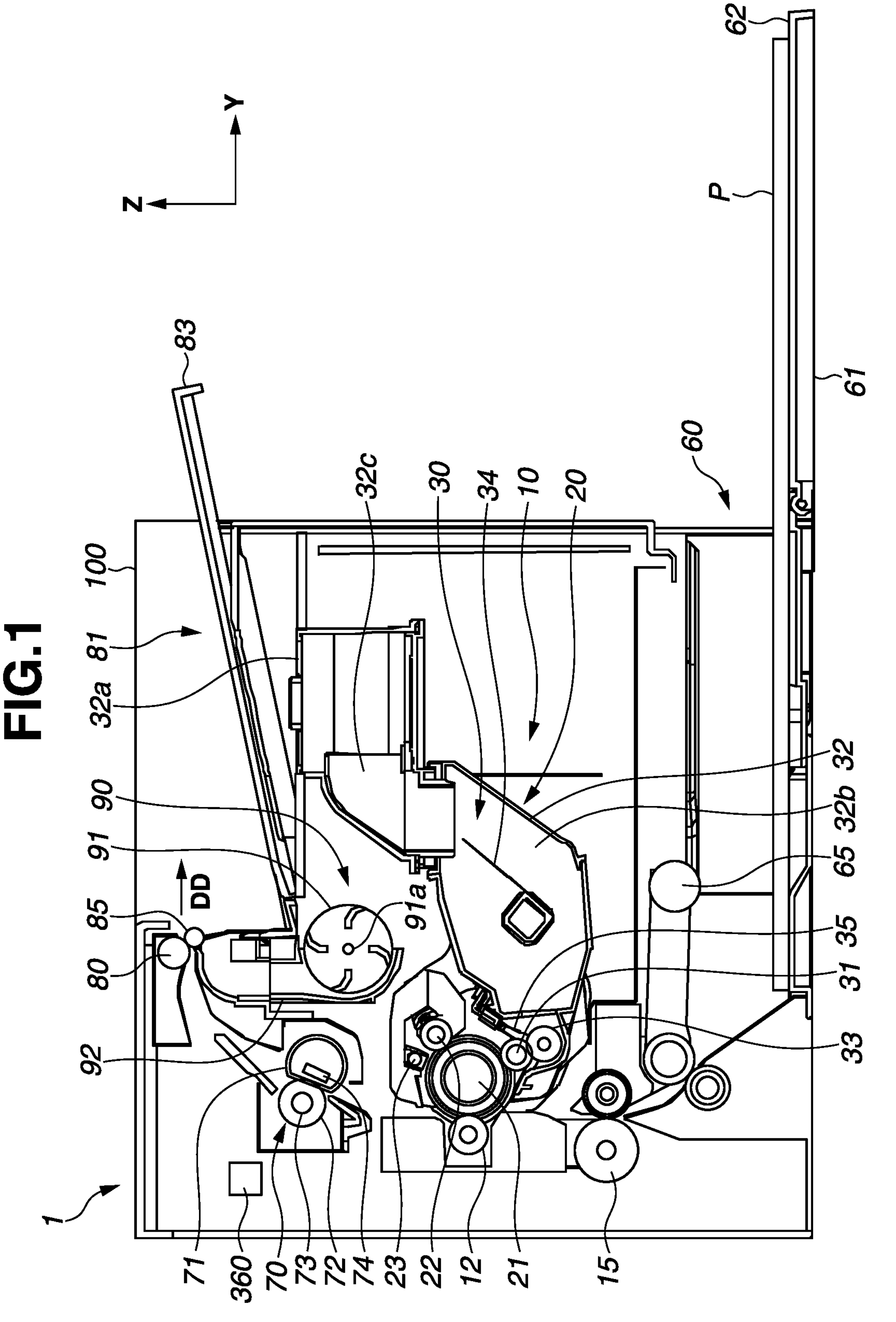
FIG. 1 is a schematic diagram illustrating a configuration of an image forming apparatus according to a first exemplary embodiment.

FIG. 1 is a schematic diagram illustrating an overall configuration of the image forming apparatus 1. The image forming apparatus 1 includes an image forming unit 10 that forms a toner image on a recording material P, a feeding unit 60 that feeds the recording material P to the image forming unit 10, a fixing device 70 that fixes the toner image formed by the image forming unit 10 onto the recording material P, and a discharge roller pair 80. An apparatus main body 100 includes a control unit 360 that controls an image forming operation performed by the image forming unit 10 on the recording material P.

The image forming unit 10 includes a scanner unit (not illustrated), a process cartridge 20, and a transfer roller 12. The process cartridge 20 includes a photosensitive drum 21, a charging roller 22 arranged on the periphery of the photosensitive drum 21, a pre-exposure device 23, and a development device 30 including a development roller 31.

The photosensitive drum 21 is a photosensitive member formed into a cylindrical shape. The photosensitive drum 21 serving as an image bearing member is driven by a motor (not illustrated) to rotate at a predetermined process speed in a clockwise direction in FIG. 1. As the photosensitive drum 21 rotates, a surface of the photosensitive drum 21 is sequentially charged by the charging roller 22.

The scanner unit (not illustrated) serving as an exposure unit irradiates the photosensitive drum 21 with a laser beam based on image information input from an external device by using a polygon mirror and thus scans and exposes the surface of the photosensitive drum 21 with the laser beam. By the exposure, an electrostatic latent image is formed on the surface of the photosensitive drum 21 based on the image information. The scanner unit (not illustrated) is not limited to the above-described configuration, and, for example, a light-emitting diode (LED) exposure device may be adopted which includes an LED array in which a plurality of LEDs is arranged along a longitudinal direction of the photosensitive drum 21.

The development device 30 includes the development roller 31 as a developer carrying member that carries developer (toner), a development container 32 that serves as a frame body of the development device 30, and a supply roller 33 that supplies the developer to the development roller 31. The development roller 31 and the supply roller 33 are rotatably supported by the development container 32.

The development device 30 according to the present exemplary embodiment adopts a contact development method as a development method. In other words, the development roller 31 comes into contact with the photosensitive drum 21. A development voltage is applied to the development roller 31 by a high-voltage development power source. The toner carried by the development roller 31 is transferred from the development roller 31 to the surface of the photosensitive drum 21 according to potential distribution on the surface of the photosensitive drum 21 under the development voltage, and thus the electrostatic latent image is developed into a toner image.

It is described in details below, a toner pack 40 (not illustrated in FIG. 1) serving as a toner replenishment container is attachable to and detachable from the image forming apparatus 1 according to the present exemplary embodiment. The development container 32 includes a replenishment port 32*a* which the toner pack 40 is attached to and detached from, a storage unit 32*b*, and a replenishment unit 32*c*. The storage unit 32*b* includes therein the development roller 31, the supply roller 33, and a stirring member 34 that stirs the toner. The replenishment unit 32*c* connects the replenishment port 32*a* and the storage unit 32*b* and guides the toner replenished from the toner pack 40 to the storage unit 32*b*.

The feeding unit 60 includes a front cover 61 that can be opened and closed with respect to the apparatus main body 100 (also referred to as a housing), a sheet feeding tray 62, and a pickup roller 65 that can move up and down. In the configuration according to the present exemplary embodiment, in a state where the front cover 61 is opened, the recording material P can be placed on the sheet feeding tray 62.

The fixing device 70 adopts a heat fixing method for performing fixing processing by heating and melting toner. The fixing device 70 includes a fixing film 71, a heater 74 (a heating member), such as a ceramic heater, that heats the fixing film 71, and a thermistor (not illustrated) that measures a temperature of the heater 74. The fixing device 70 further includes a pressing roller 72 (a pressing member) that forms a fixing nip with the heater 74 via the fixing film 71 and applies pressure to the recording material P. The pressing roller 72 includes a rotating shaft 73 and can rotate about the rotating shaft 73.

The image forming apparatus 1 according to the present exemplary embodiment is provided with a blowing unit 90 for cooling the process cartridge 20. Although a detailed configuration is described below, the blowing unit 90 includes a fan 91 that sends air and a fan holder 92 that supports the fan 91 and forms an air path. The fan 91 includes a rotating shaft 91*a* and can rotate about the rotating shaft 91*a*.

As illustrated in FIG. 1, the rotating shaft 91*a* of the fan 91 is located on a downstream side of the rotating shaft 73 of the pressing roller 72 in a discharge direction DD. The fan 91 is located just above the development device 30 in the vertical direction, and the fan 91 and the development device 30 are in such a relationship that the fan 91 and the development device 30 partially overlap each other when viewed from above in the vertical direction. Of the components of the development device 30, a part of the storage unit 32*b* included in the development container 32 particularly overlaps the fan 91, and the replenishment unit 32*c* does not overlap the fan 91.

Operation of Image Forming Apparatus

Next, an image forming operation performed by the image forming apparatus 1 is described. If an image forming instruction is input to the image forming apparatus 1, an image forming process to be performed by the image forming unit 10 is started based on image information input from an external computer connected to the image forming apparatus 1. The scanner unit (not illustrated) irradiates the photosensitive drum 21 with a laser beam based on the input image information. At this time, the photosensitive drum 21 has been charged by the charging roller 22 in advance, and thus an electrostatic latent image is formed on the photosensitive drum 21 by being irradiated with the laser beam. Then, the electrostatic latent image is developed by the development roller 31, and a toner image is formed on the photosensitive drum 21.

In parallel with the above-described image forming process, the pickup roller 65 of the feeding unit 60 feeds the recording material P placed on the sheet feeding tray 62. The recording material P is fed by the pickup roller 65 to a registration roller pair 15 and abuts a nip between the registration roller pair 15, so that the skewing of the recording material P is corrected. Then, the registration roller pair 15 is driven in synchronized timing with the transfer of the toner image and conveys the recording material P to a transfer nip formed by the transfer roller 12 and the photosensitive drum 21.

The transfer roller 12 serving as a transfer unit is supplied with a transfer voltage by a high-voltage transfer power source, and the toner image carried by the photosensitive drum 21 is transferred onto the recording material P conveyed by the registration roller pair 15. The recording material P on which the toner image is transferred is conveyed to the fixing device 70, and the toner image is heated and pressed while passing through the fixing nip formed by the fixing film 71 and the pressing roller 72 in the fixing device 70. Accordingly, a toner particle is melted by the heating process and then fixed, so that the toner image is fixed to the recording material P.

The recording material P which has passed through the fixing device 70 is discharged by the discharge roller pair 80, serving as a discharge unit, to the outside from a discharge port 85 formed on the apparatus main body 100. The direction in which the recording material P is discharged from the discharge port 85 is indicated as the discharge direction DD in FIG. 1. The recording material P is discharged to the outside from the discharge port 85 and is loaded on a discharge tray 81 arranged at an upper part of the apparatus main body 100.

Attachment and Detachment Configuration of Replenishment Container

Figure 2A:
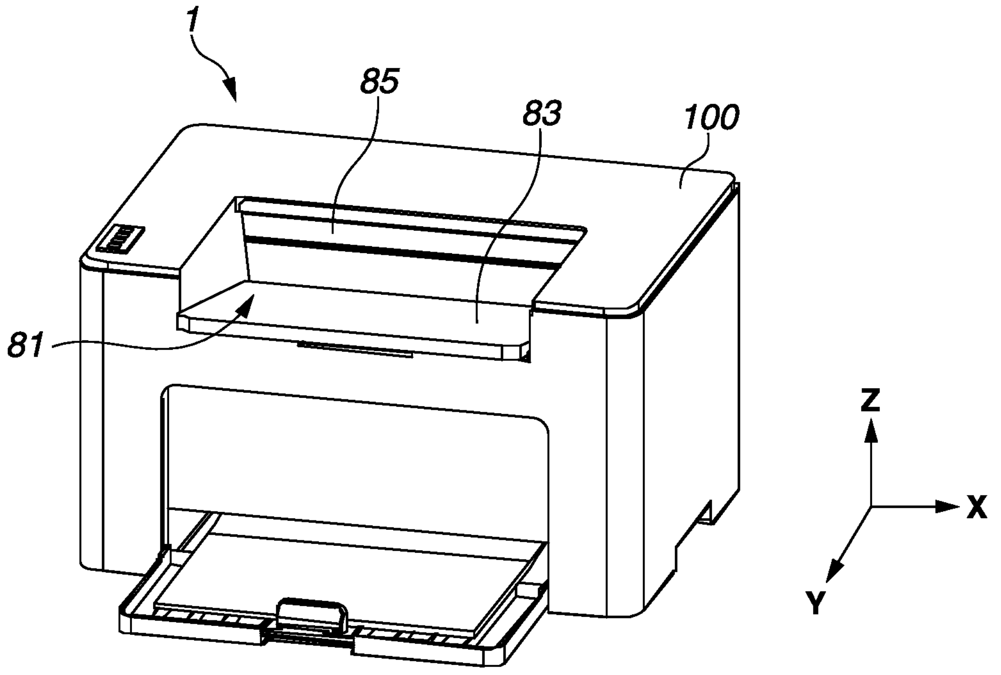
FIGS. 2A and 2B are perspective views illustrating attachment and detachment of a replenishment container according to the first exemplary embodiment.
Figure 2B:
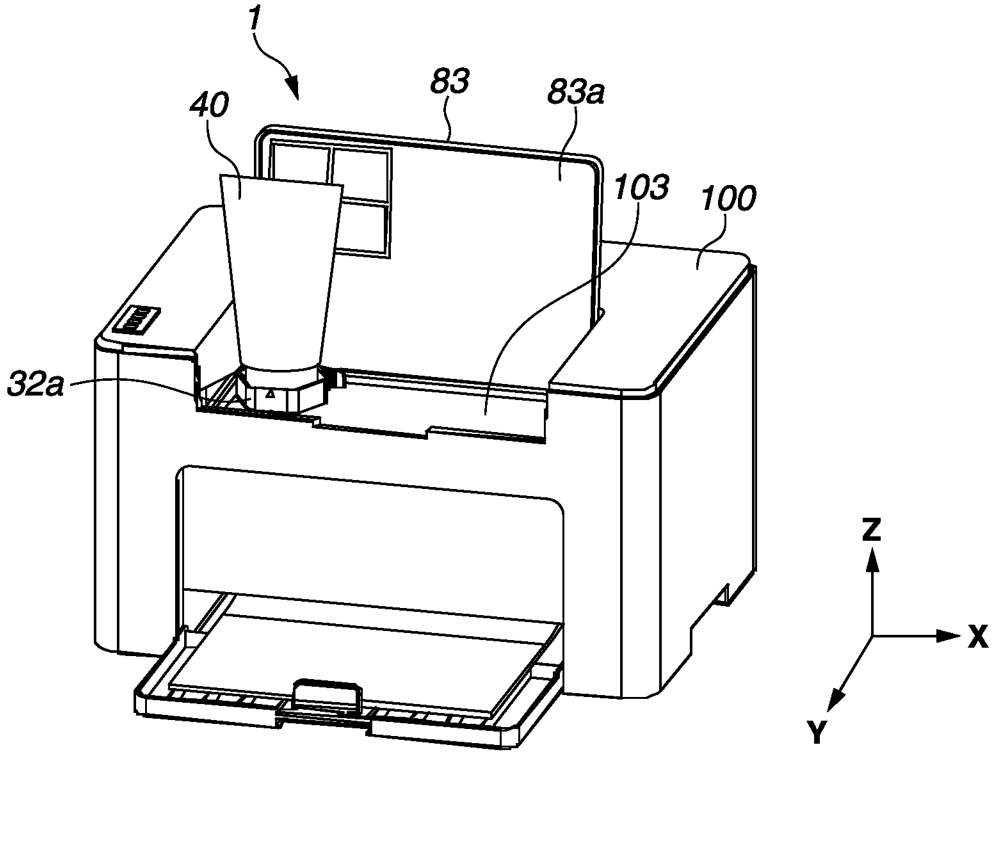

Next, an attachment and detachment configuration of the replenishment container is described with reference to FIGS. 2A and 2B. FIGS. 2A and 2B are perspective views of the image forming apparatus 1. As illustrated in FIG. 2A, the discharge port 85 is formed on the apparatus main body 100 of the image forming apparatus 1, and the discharge tray 81 is provided near the discharge port 85. A cover 83 is a part of the discharge tray 81 and can be opened and closed with respect to the apparatus main body 100. FIGS. 2A and 2B illustrate a closed state and an open state of the cover 83, respectively.

As illustrated in FIG. 2B, when the cover 83 is opened, a cover back surface 83*a*, an upper wall 103, and the replenishment port 32*a* are exposed to the outside. The upper wall 103 protects the development container 32 from above. The toner pack 40 is attached to the replenishment port 32*a*, through which the developer is replenished to the development container 32. An opening is formed on the upper wall 103, and the replenishment port 32*a* is exposed from the opening.

When the toner pack 40 is attached to the replenishment port 32*a*, a part of the toner pack 40 projects toward the outside of the housing 100, and the cover 83 is restricted from moving to a closed position.

When the cover 83 is in the closed position, the replenishment port 32*a* and the upper wall 103 are covered by the cover 83. At this time, the replenishment port 32*a* and the upper wall 103 face the cover back surface 83*a*. A user can access the replenishment port 32*a* with the cover 83 opened. According to the present exemplary embodiment, a direct replenishment method is adopted in which a user replenishes the development device 30 with the toner from the toner pack 40 filled with the toner for replenishment in a state in which the development device 30 is mounted on the image forming apparatus 1.

With the direct replenishment method, in a case where the remaining amount of toner in the process cartridge 20 becomes low, it is not necessary to perform an operation of removing the process cartridge 20 from the apparatus main body 100 and replacing it with a new process cartridge 20, so that usability can be improved. The development container 32 can be replenished with the toner at a lower cost than a case of replacing the entire process cartridge 20. Since it is not necessary to replace various rollers and gears in the direct replenishment method, the cost can be reduced as compared with a case where only the development device 30 in the process cartridge 20 is replaced.

The process cartridge 20 may be configured to be removable from the apparatus main body 100.

Configuration of Blowing Unit

A configuration of the blowing unit 90 according to the present exemplary embodiment is described with reference to FIGS. 1, 3A to 3C, and 4A to 4D. As described above with reference to FIG. 1, the fan 91 is arranged between the fixing device 70 and the process cartridge 20 and near a portion below the discharge tray 81 according to the present exemplary embodiment. By arranging the fan 91 at the position, it is possible to prevent heat generated in the fixing device 70 from being transferred to the process cartridge 20 and also to prevent heat from the recording material P heated by the fixing device 70 from being transferred to the process cartridge 20 as will be described below. Further, it is possible to cool the recording material P conveyed by the discharge roller pair 80 while cooling an entire inside of the apparatus main body 100.

The fan 91 rotates in a clockwise direction in FIG. 1 and cools the inside of the apparatus main body 100 by taking in outside air while discharging warmed air inside the apparatus main body 100 to the outside. Further, the fan 91 cools the recording material P at the time of discharging the inside air and can prevent the recording materials P from sticking to each other on the discharge tray 81 due to influence of the toner.

The fan holder 92 is fixed to a stay (not illustrated) fixed to a sheet metal frame (not illustrated) of the apparatus main body 100. The sheet metal frame is provided at each position on the negative side (the left side) and the positive side (the right side) in the X direction, and a surface of the frame is substantially parallel to an YZ plane.

Assuming that the frames on the negative side and the positive side in the X direction are respectively referred to as a left sheet metal frame and a right sheet metal frame, the stay extending in the X direction is fixed to the left sheet metal frame at one end thereof and to the right sheet metal frame at the other end thereof to connect the two frames. The fan holder 92 is then fixed to the stay extending in the X direction. In such a manner, the fan holder 92 can be firmly fixed to the sheet metal frames (not illustrated) of the apparatus main body 100 via the stay (not illustrated), thereby preventing a vibration caused by rotation of the fan 91 and a noise caused by the vibration. Further, in a case where the image forming apparatus 1 is installed on a distorted floor surface, distortion of the fan holder 92 can be suppressed, and it is possible to prevent abnormal noise during rotation of the fan 91.

Since the fan 91 is arranged between the fixing device 70 and the process cartridge 20, heat from the fixing device 70 can be blocked from flowing to the process cartridge 20. Further, since the warmed air around the process cartridge 20 is discharged to the outside of the apparatus main body 100, temperature rise in the process cartridge 20 is prevented, and the toner in the development container 32 is prevented from sticking to the inside thereof.

According to the present exemplary embodiment, the fan 91 is arranged in an area connecting the fixing device 70 and the process cartridge 20, takes in air from the process cartridge 20 side, and discharges the air toward the recording material P conveyed by the discharge roller pair 80. Accordingly, the fan 91 can efficiently cool both of the process cartridge 20 and the recording material P.

Figures 3A, 3B, 3C:
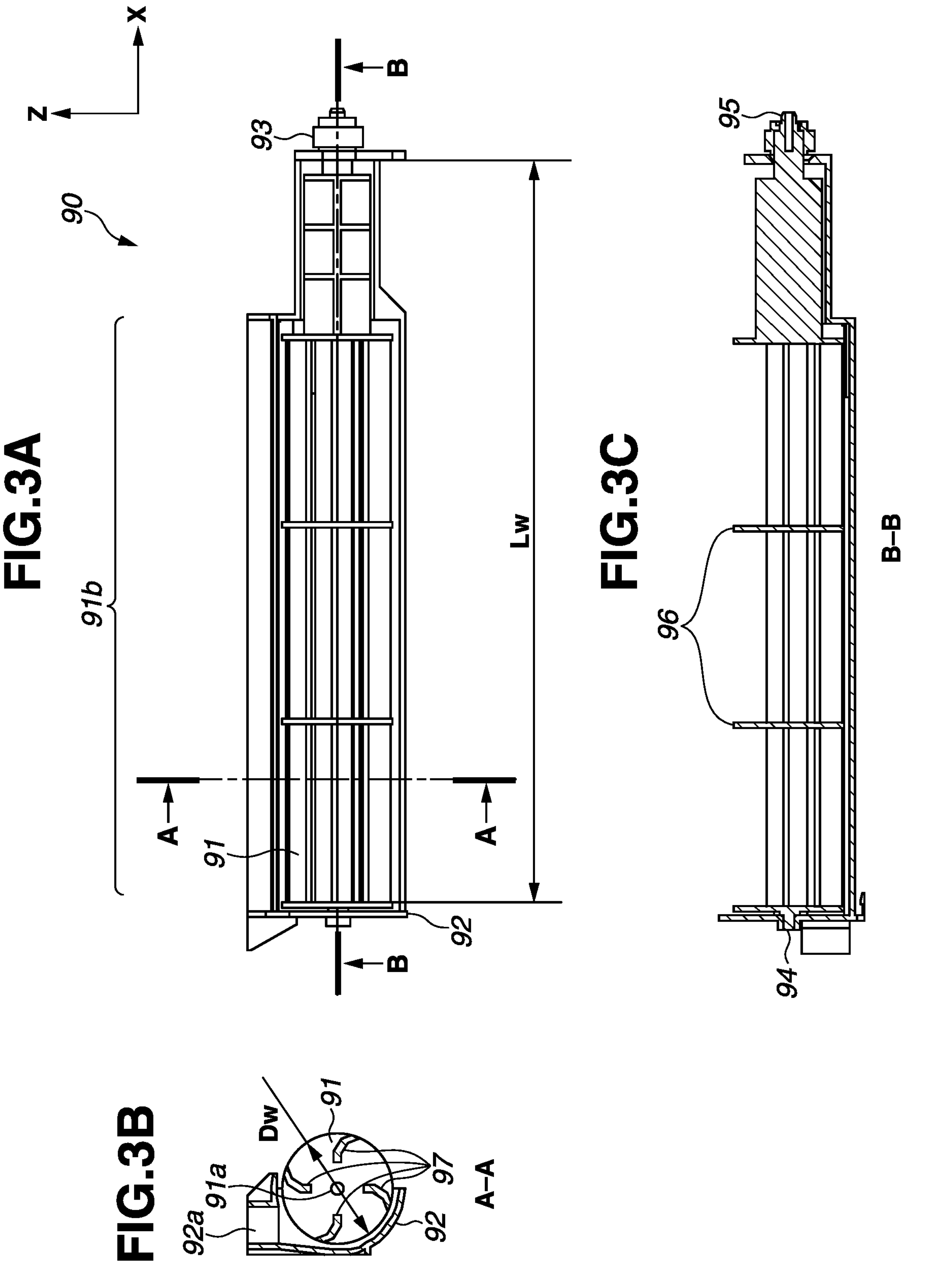
FIGS. 3A, 3B, and 3C illustrate a blowing unit according to the first exemplary embodiment.

FIGS. 3A, 3B, and 3C are enlarged views of the blowing unit 90. FIG. 3A is the enlarged view of the blowing unit 90 when viewed from the front side (the positive side in the Y direction). FIG. 3B is a cross-sectional view of the blowing unit 90 along an A-A cross section illustrated in FIG. 3A. FIG. 3C is a cross-sectional view of the blowing unit 90 along a B-B cross section illustrated in FIG. 3A.

As illustrated in FIG. 3A, the fan 91 according to the present exemplary embodiment is a cross flow fan extending in the X direction (the longitudinal direction of the photosensitive drum 21). A length of the fan 91 in the X direction is indicated by Lw. As illustrated in FIG. 3B, a blower portion 91*b* that assumes the role of actually sending air in the fan 91 is provided with four blades 97 around the rotating shaft 91*a*. A diameter of a rotational trajectory of the blades 97 is indicated by Dw. A magnitude relationship between the length Lw of the fan 91 in the X direction and the diameter Dw of the rotational trajectory is Lw>Dw.

The cross flow fan as described above is characterized in that it can uniformly and efficiently send air to a wide object to be cooled and thus can prevent uneven cooling on the left and right sides of the object in a width direction thereof. Furthermore, a total area of each of the blades 97 can be increased by extending the blade 97 in the width direction, so that a large volume of air can be secured even by slowly rotating the blades 97. Therefore, it is not necessary to rotate the fan 91 at a fast speed, and an operation noise can be reduced.

As illustrated in FIG. 3A, a drive gear 93 is provided at an end portion of the blowing unit 90 on the positive side in the X direction. The drive gear 93 is a gear for rotating the fan 91 by receiving a driving force of the motor (not illustrated) provided in the image forming apparatus 1.

As illustrated in FIG. 3C, a boss 94 is provided at an end portion of the fan 91 on the negative side in the X direction and is supported by the fan holder 92. A boss 95 is provided at the end portion of the fan 91 on the positive side in the X direction and is supported by the right sheet metal frame (not illustrated) of the apparatus main body 100. The boss 95 penetrates the drive gear 93 and is fixed thereto. Both of the bosses 94 and 95 form the rotating shaft 91*a* of the fan 91.

The boss 95 is supported by the right sheet metal frame (not illustrated) of the apparatus main body 100, so that position accuracy can be secured between a drive input gear (not illustrated) that receives a driving force from the motor provided on the right sheet metal frame (not illustrated) and the drive gear 93.

As illustrated in FIG. 3C, the fan 91 is provided with two reinforcement ribs 96 to secure rigidity of the fan 91 against torsion during rotation. As illustrated in FIG. 3B, the rotating fan 91 takes the air inside the apparatus main body 100 into the fan holder 92 by using the blades 97 and sends the air to a blowing port 92*a*.

According to the present exemplary embodiment, the reinforcement ribs 96 are provided to secure the rigidity of the fan 91 against torsion during rotation, but may not be provided in a case where the rigidity can be secured. The number of the blades 97 is not limited to four, and a shape of each blade 97 is not limited to the one described in the present exemplary embodiment.

FIGS. 4A to 4D illustrate some variations of the configuration of the fan 91. In FIGS. 4A to 4D, end portions on the negative side and the positive side in the X direction of the recording material P having a maximum size which can be conveyed by the image forming apparatus 1 are indicated by Pa and Pb, respectively. Further, end portions on the negative side and the positive side in the X direction of an area in which the blades 97 are formed in the fan 91 are indicated by 97*a* and 97*b*, respectively.

Figures 4A, 4B, 4C, 4D:
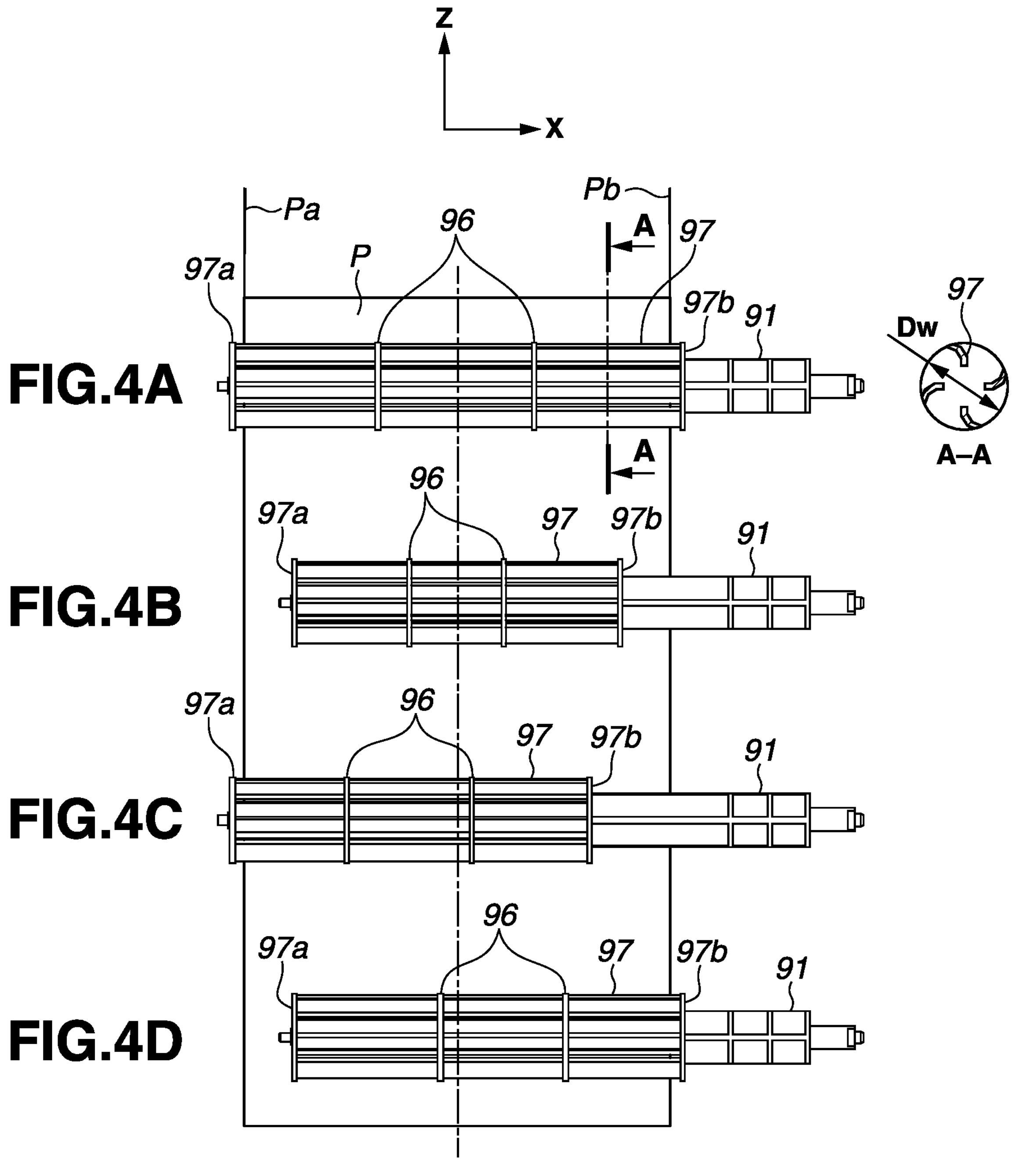
FIGS. 4A to 4D illustrate variations of a configuration of a fan according to the first exemplary embodiment.

In FIG. 4A, the area in which the blades 97 are formed extends outward in the X direction from a width of the recording material P having the maximum size. In other words, the end portion 97*a* is located on the negative side of the end portion Pa in the X direction, and the end portion 97*b* is located on the positive side of the end portion Pb in the X direction. The above described configuration is suitable for, for example, a case where an arrangement space of the blowing unit 90 is small, and a size of each blade 97 (the diameter Dw of the rotational trajectory) cannot be increased, since a sufficient volume of air can be secured by extending the length of each blade 97 in the X direction to increase the total area of each blade 97.

In a case where the sufficient volume of air can be secured, both or only one of the end portions 97*a* and 97*b* may be located on the inner side in the X direction relatively to the end portions Pa and Pb of the recording material P having the maximum size as illustrated in FIGS. 4B, 4C, and 4D. In FIG. 4B, the end portion 97*a* is located on the positive side in the X direction of the end portion Pa, and the end portion 97*b* is located on the negative side in the X direction of the end portion Pb. In FIG. 4C, the end portion 97*a* is located on the negative side in the X direction of the end portion Pa, and the end portion 97*b* is located on the negative side in the X direction of the end portion Pb. In FIG. 4D, the end portion 97*a* is located on the positive side in the X direction of the end portion Pa, and the end portion 97*b* is located on the positive side in the X direction of the end portion Pb.

In any of the configurations in FIGS. 4A to 4D, in a case where the rigidity of the fan 91 can be secured against torsion during rotation, the reinforcement ribs 96 are not required. According to the present exemplary embodiment, the configuration in FIG. 4B is adopted because the sufficient air volume can be secured and in view of an arrangement with members in the vicinity of the blowing unit 90.

According to the present exemplary embodiment, the drive motor (not illustrated) for rotating the fan 91 also serves as a motor for driving the feeding unit 60, the image forming unit 10, the fixing device 70, and the like. Therefore, the drive gear 93 and the fan 91 start to rotate at the same time when the image forming apparatus 1 starts an operation, and the drive gear 93 and the fan 91 stop rotating at the same time when the image forming apparatus 1 stops the operation. However, a drive motor only for driving the fan 91 may be separately provided, and the fan 91 may be rotated by the drive motor even when the operation of the image forming apparatus 1 is stopped.

Figure 5:
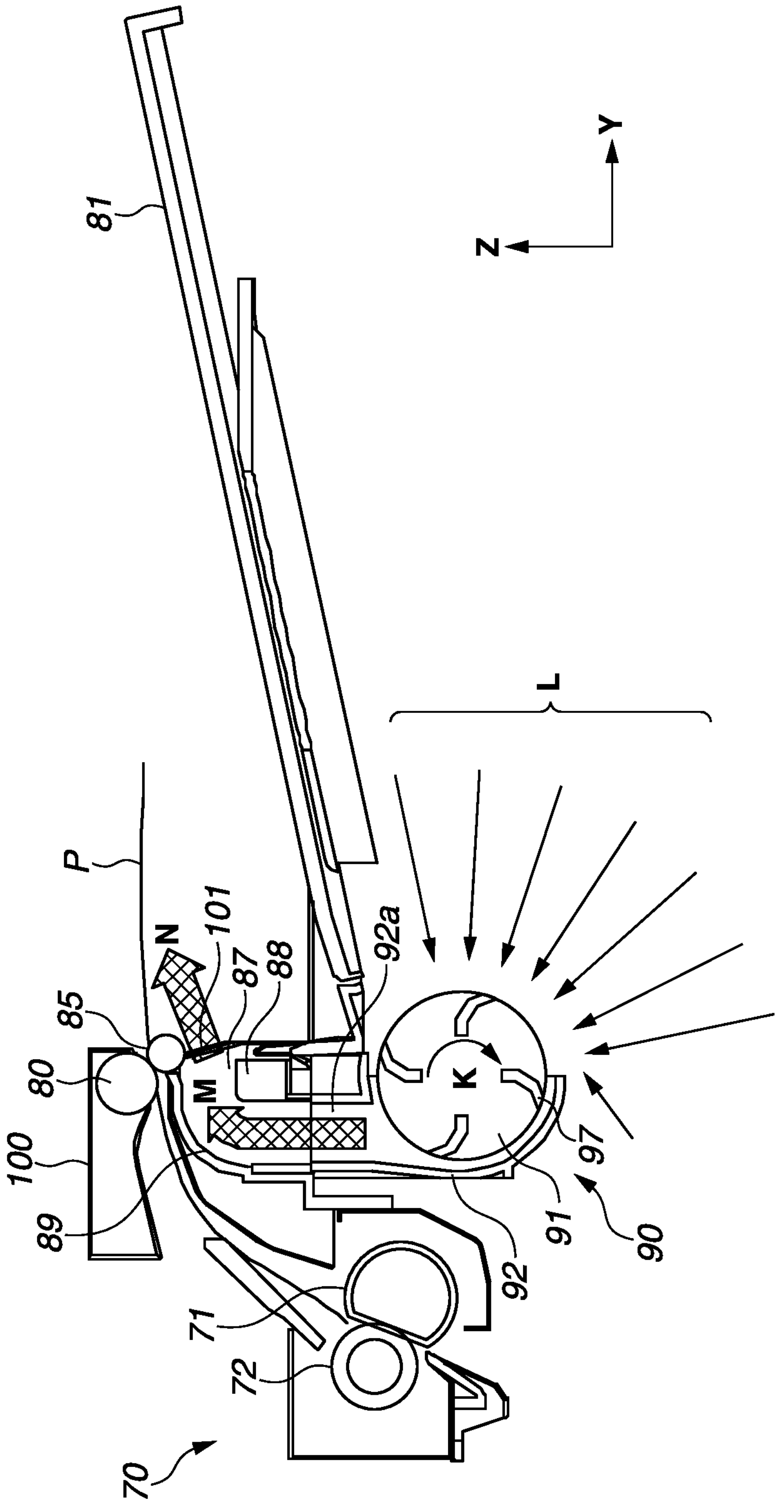
FIG. 5 illustrates a flow of air generated by the blowing unit according to the first exemplary embodiment.

FIG. 5 illustrates a flow of air generated by the fan 91. As illustrated in FIG. 5, the fan 91 rotates in a direction of an arrow K, which is the clockwise direction, and the air inside the apparatus main body 100 flows in directions of arrows L by the blades 97 of the fan 91 and is taken into the fan holder 92. The air taken into the fan holder 92 is sent from the blowing port 92*a* through a duct 87 formed by a discharge lower guide 88 and a discharge upper guide 89 in a direction of an arrow M. A length of the duct 87 is made as short as possible, and a duct shape is optimized so as not to reduce air blowing efficiency.

An exhaust port 101 is formed in the apparatus main body 100 vertically below the discharge port 85 from which the recording material P is discharged. The air sent through the duct 87 is discharged to the outside of the apparatus main body 100 through the exhaust port 101 in a direction indicated by an arrow N. The warmed air inside the apparatus main body 100 is discharged to the outside of the apparatus main body 100 in such a manner.

At this time, the air discharged to the outside hits a lower surface, i.e., a printed surface, of the recording material P conveyed to the discharge tray 81 and cools the recording material P. The air blown toward the recording material P is the warmed air inside the apparatus main body 100. However, a temperature of the air blown toward the lower surface of the recording material P is lower by 40° C. or more than a temperature of the recording material P heated by the fixing device 70, and thus the recording material P can be sufficiently cooled.

Further, cooling each recording material P can prevent recording media P from sticking to each other on the discharge tray 81 due to the influence of the toner. During a sheet interval in which the recording material P is not discharged, only the discharging of the air inside the apparatus main body 100 to the outside is performed.

The blowing unit 90 sends the warmed air inside the apparatus main body 100 to the outside and, at the same time, takes in outside air to the inside of the apparatus main body 100 from a gap between exterior members, a gap to a floor surface, the sheet feeding tray 62, and the like. As described above, outside air is taken into the apparatus main body 100 through many parts of the apparatus and made to flow inside the apparatus main body 100 to cool the inside of the apparatus main body 100. The air warmed up inside the apparatus main body 100 is discharged to the outside of the apparatus main body 100. Accordingly, the entire apparatus main body 100 can be stably cooled.

As described above, the blowing unit 90 takes in outside air cooler than the air inside the apparatus main body 100 through many parts of the apparatus main body 100 while discharging the warmed air, so that the entire inside of the apparatus main body 100 can be stably cooled, and the recording material P can be also cooled.

According to the present exemplary embodiment, a louver is not provided on the exterior member since outside air is taken in through the gap between the exterior members, the gap to the floor surface, a recording material storage space, and the like as described above. In other words, conventionally, a cooling fan is installed near the exterior member to take in outside air, and thus a louver is provided on an air passage hole from the viewpoint of safety so that a user does not touch an operating member (the fan). However, according to the present exemplary embodiment, the blowing unit 90 can be installed inside the apparatus main body 100, so that it is not necessary to install a louver.

According to the present exemplary embodiment, the apparatus main body 100 is provided with the exhaust port 101, but a louver for taking in air is not separately provided. Therefore, it is possible to prevent an operating noise of the apparatus main body 100 from leaking to the outside of the image forming apparatus 1 and thus to provide an image forming apparatus with reduced noise emission. Further, since the blowing unit 90 is arranged inside the apparatus main body 100 in the first place, this produces an effect that the operating noise of the blowing unit 90 is less likely to leak to the outside.

In a case where it is intended to improve a cooling performance of a specific unit or member, a louver may be provided on an exterior member near the unit or member to be cooled to actively cool the unit or member by taking in outside air. In this case, it is desirable to make the gap between the other exterior members and the gap to the floor surface as small as possible so that more outside air is taken in through the louver to cool the specific unit or member.

As described above, according to the present exemplary embodiment, it is possible to prevent temperature rise around the development device 30 while suppressing increase in size and cost of the apparatus. Accordingly, toner stored in the development container 32 can be prevented from being fixed therein.

Next, a second exemplary embodiment is described with reference to FIGS. 6 and 7A to 7D. According to the present exemplary embodiment, only a shape of the fan 91 is different from that according to the first exemplary embodiment, so that the descriptions of the configurations other than that are omitted.

Figure 6:
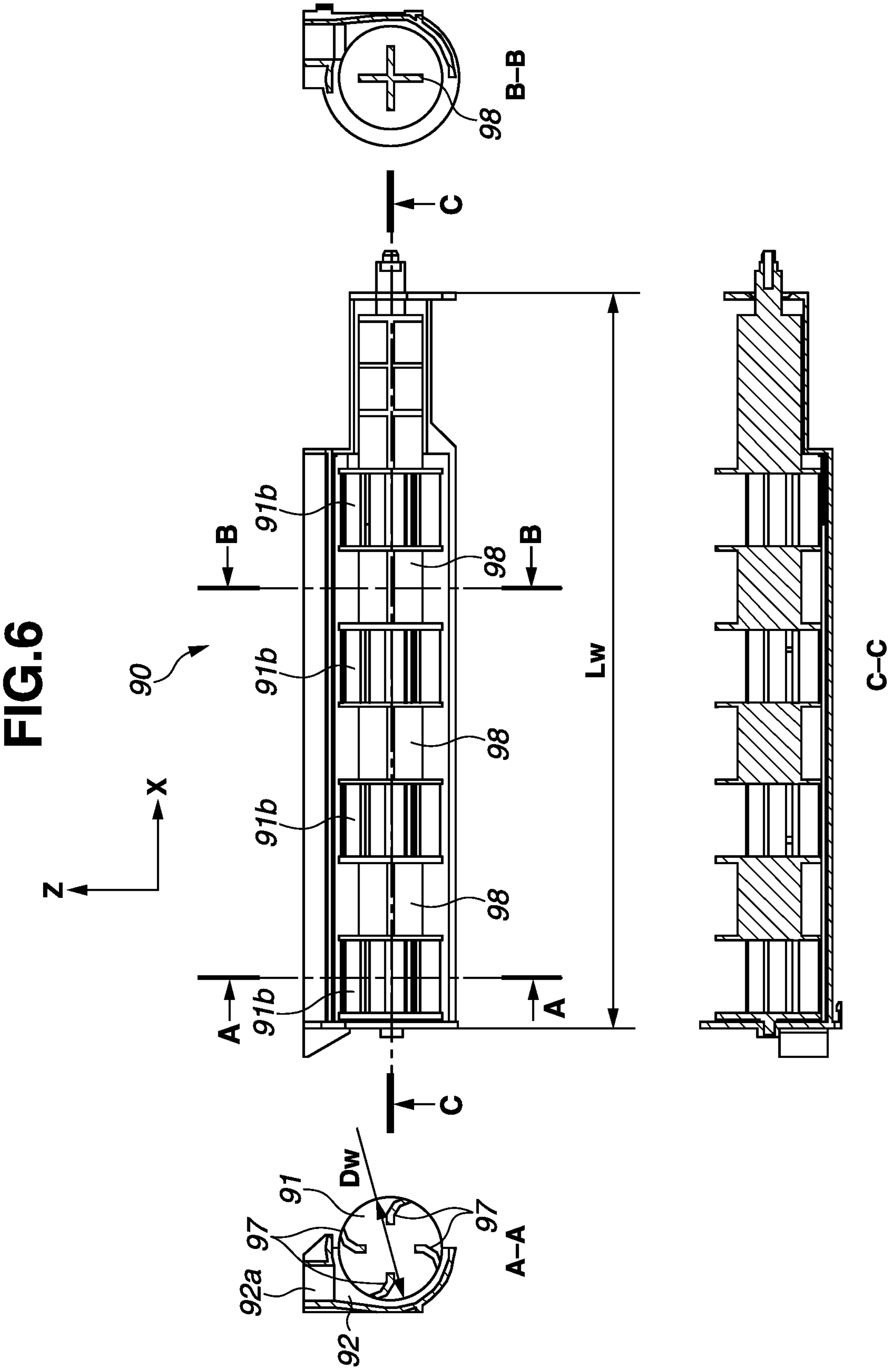
FIG. 6 illustrates a blowing unit according to a second exemplary embodiment.

As illustrated in FIG. 6, the fan 91 according to the present exemplary embodiment includes a plurality of blower portions 91*b* in which the blades 97 are formed in a rotating axis direction, and the blower portions 91*b* are connected to each other by a cross-shaped rib 98. In a case where it is not necessary to cool an entire area in the width direction or in a case where a small volume of air is sufficient, the inside of the apparatus main body 100 may be cooled by using the fan 91 illustrated in FIG. 6. Outside air may be taken in through the gap between the exterior members, the gap to the floor surface, the sheet feeding tray 62, and the like to the inside of the apparatus main body 100 as with the first exemplary embodiment. Further, in a case where it is intended to improve the performance in cooling the specific unit or member, the louver may be provided on the exterior member to cool the specific unit or member.

In FIG. 6, the blower portions 91*b* are provided at four positions, but the number of positions where the blower portions 91*b* are arranged is not limited to four, and the number of the blower blades 97 is not limited to four, either. Furthermore, the shape of each blower blade 97 is not limited to the one described in the present exemplary embodiment.

According to the present exemplary embodiment, the blowing unit 90 can be installed in a space of any size, ranging from a wide space to a narrow space, by adjusting the diameter (Dw) of the fan 91, so that the diameter (Dw) of the fan 91 may be set according to a space in which the blowing unit 90 is installed. The length (Lw) of the blade 97 may be set in consideration of the necessary volume of air and the arrangement of the members in the vicinity of the blowing unit 90 as described above.

Figures 7A, 7B, 7C, 7D:
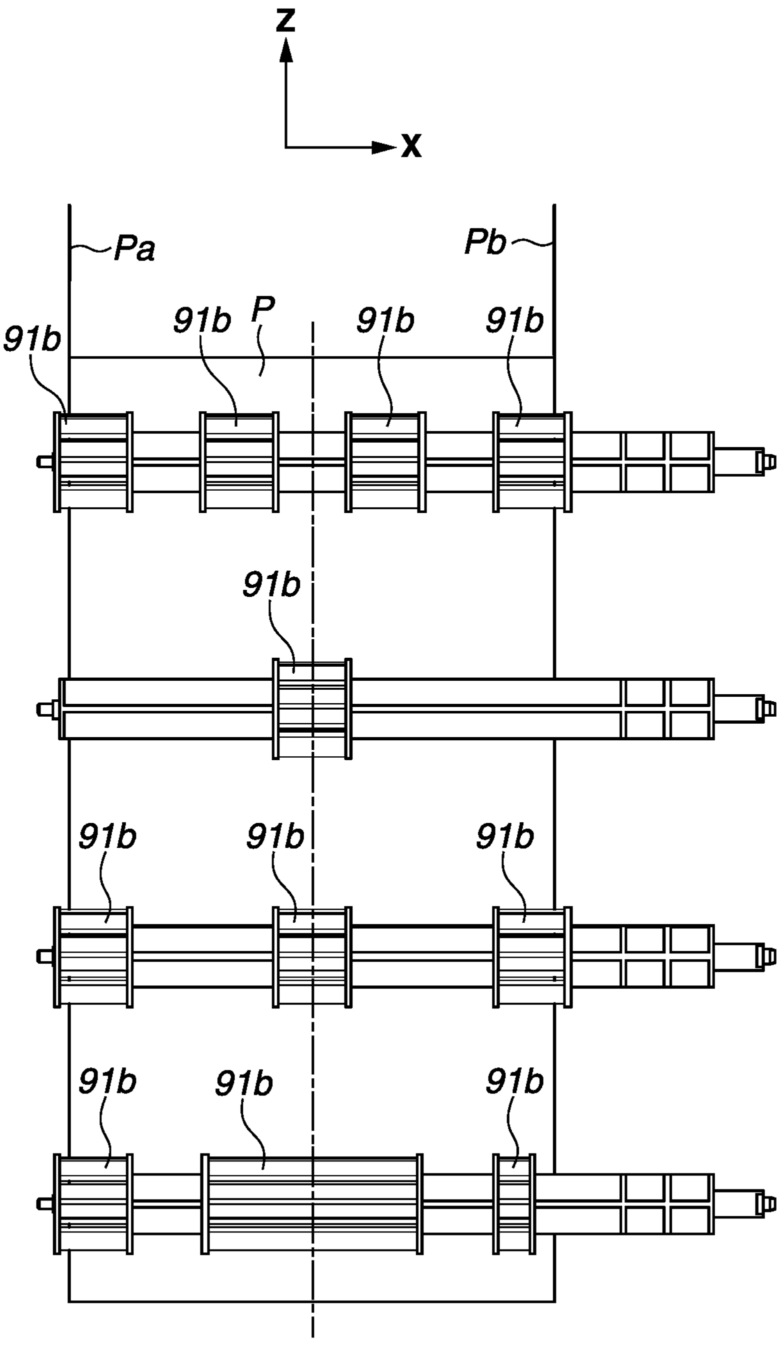
FIGS. 7A to 7D illustrate variations of a configuration of a fan according to the second exemplary embodiment.

One or a plurality of the blower portions 91*b* may be provided in the rotating axis direction as illustrated in FIGS. 7A to 7D to cool the inside of the apparatus main body 100. As illustrated in FIG. 7B, in a case where the unit or member to be cooled is only near the center of a sheet passing area, one blower portion 91*b* may be provided only at a position near the center, and the louver may be also provided at a position on the exterior member at which the efficiency in cooling the unit or member to be cooled is high.

In a case where the center portion and both end portions of the sheet passing area are to be cooled as illustrated in FIG. 7C, three blower portions 91*b* and louvers may be provided at the respective places having high cooling efficiency. Further, as illustrated in FIG. 7D, in a case where sizes of objects to be cooled are different, lengths of the blower portions 91*b* in the width direction and sizes of the louvers may be changed and provided at the respective places having high cooling efficiency to efficiently cool the objects.

As described above, FIGS. 7B, 7C, and 7D each illustrates a case where louvers are provided on the exterior member so that the objects to be cooled can be efficiently cooled. In these cases, it is desirable to make the gap between the other exterior members and the gap to the floor surface as small as possible so that more outside air is taken in through the louvers to cool the unit or member to be cooled.

As described above, according to the present exemplary embodiment, it is possible to prevent air from being sent to a place that is not desired to be cooled, and usability is further improved, in addition to the effect of the first exemplary embodiment.

Next, a third exemplary embodiment is described with reference to FIGS. 8A, 8B, and 8C. According to the present exemplary embodiment, only the fan 91 and the fan holder 92 are different from those described in the first and the second exemplary embodiments, so that the descriptions of the configurations other than those are omitted.

Figure 8A:
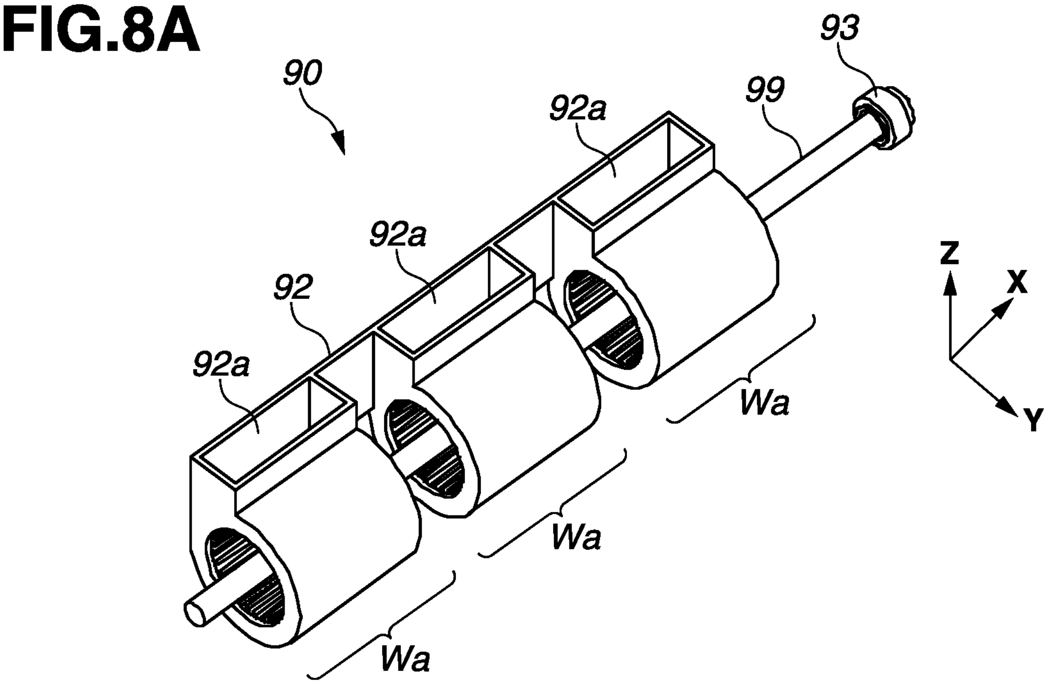
FIGS. 8A, 8B, and 8C illustrate a blowing unit according to a third exemplary embodiment.
Figure 8B:
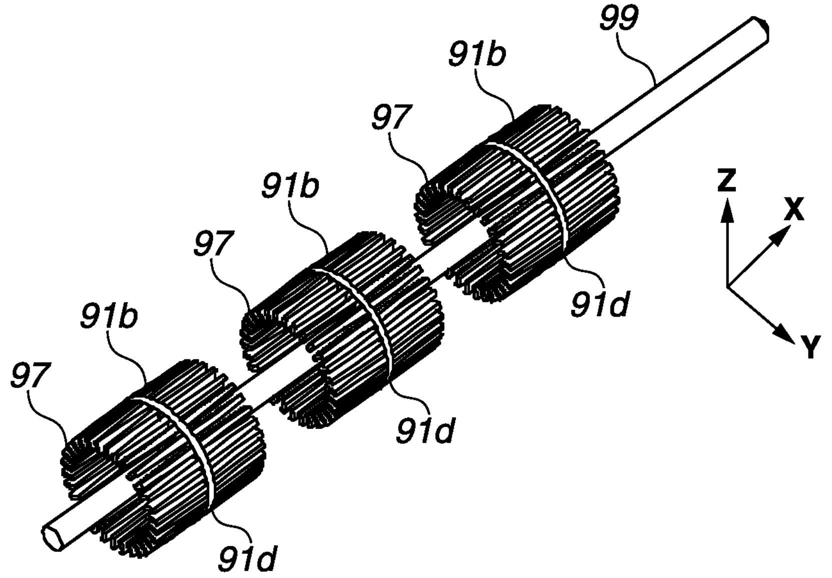

FIGS. 8A and 8B are perspective views of the blowing unit 90 and the fan 91, respectively, according to the present exemplary embodiment. As illustrated in FIG. 8B, a plurality of the blower portions 91*b* provided with blades 97 is provided in the rotating axis direction, and the blower portions 91*b* are connected to each other by ribs 91*d* and a shaft 99. The shaft 99 constitutes the rotating shaft 91*a* of the fan 91. According to the present exemplary embodiment, the number of the blades 97 is set to 30.

Further, as illustrated in FIG. 8A, each blowing port 92*a* of the fan holder 92 is provided only in a range Wa (a range corresponding to the blower portion 91*b*) in which the blades 97 are provided. In a case where it is not necessary to cool the entire area in the width direction, the inside of the apparatus main body 100 may be cooled by the fan 91 illustrated in FIG. 8A. By using the fan 91 having the blowing ports 92*a* only in the ranges Wa in which the blades 97 are provided as described above to send air, it is possible to send more air to the unit or member to be cooled intensively, so that the unit or member can be efficiently cooled. In this case, the unit or member to be cooled is limited to a unit or a member of which a temperature is higher than the temperature of air taken in by the blades 97. Outside air may be taken into the apparatus main body 100 through the gap between the exterior members, the gap to the floor surface, the recording material storage space, and the like, as with the first exemplary embodiment. Further, in a case where it is intended to improve the performance in cooling the unit or member to be cooled, the louver may be provided on the exterior member to cool the unit or member to be cooled.

Figure 8C:
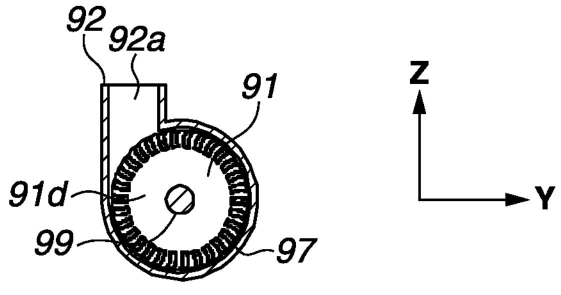

In FIGS. 8A, 8B, and 8C, the three blower portions 91*b* and the three blowing ports 92*a* are provided, but the number of blower portions 91*b* and the number of blowing ports 92*a* are not limited to three, and the number of the blades 97 is not limited to 30, either. Further, the shape of each blade 97 is not limited to the shape described in the present exemplary embodiment. A width of the area where the blades 97 are provided is not limited to the width Wa, which is the same as that of the blowing port 92*a*, as described in the present exemplary embodiment.

According to the present exemplary embodiment, the blowing unit 90 can be installed in a space of any size, ranging from a wide space to a narrow space, by adjusting the diameter (Dw) of the fan 91, so that the diameter (Dw) of the fan 91 may be set according to a space in which the blowing unit 90 is installed. The length (Lw) of the blade 97 may be set in consideration of the necessary volume of air and the arrangement of the members in the vicinity of the blowing unit 90 as described above.

As described above, according to the present exemplary embodiment, it is possible to prevent air from being sent to a place that is not desired to be cooled, and usability is further improved, in addition to the effect of the first exemplary embodiment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

a photosensitive drum;

a development device including a development roller for supplying development toner to the photosensitive drum and a development container provided with a replenishment port in which a replenishment container of replenishment toner is configured to be attached to and detached from;

a fixing device configured to fix a toner image transferred from the photosensitive drum to a recording material;

an apparatus main body provided with a discharge port from which the recording material to which the toner image is fixed is to be discharged;

a discharge tray on which the recording material discharged from the discharge port is loaded, wherein the discharge tray is openable and closable with respect to the apparatus main body;

a wall configured to cover the development container and provided with an opening;

a fan including a rotating shaft that extends in a longitudinal direction of the photosensitive drum, a blade disposed around the rotating shaft, a drive gear configured to receive a driving force, and a boss;

a fan holder configured to support the boss; and a duct connected to the fan holder and configured to guide air supplied from the fan holder toward the discharge port, wherein a length of the rotating shaft of the fan in the longitudinal direction is longer than a diameter of a rotational trajectory of the blade, and wherein the fan holder and the duct are disposed above the development device in a vertical direction when the image forming apparatus is placed on a horizontal surface so that the discharge port is disposed above the development device.

2. The image forming apparatus according to claim 1, wherein the fan is provided on a downstream side of the fixing device in a discharge direction in which the recording material is discharged from the discharge port and overlaps a part of the development device when viewed in the vertical direction.

3. The image forming apparatus according to claim 2, wherein the fixing device includes a heating member for heating the recording material, and a pressing roller for pressing the recording material and that forms a fixing nip with the heating member, and wherein, when viewed in a rotating axis direction of the fan, the rotating shaft of the fan is located on a downstream side of a rotating shaft of the pressing roller in the discharge direction.

4. The image forming apparatus according to claim 3, wherein, when viewed in the vertical direction, the fan overlaps a part of the development container.

5. The image forming apparatus according to claim 4, wherein the development container includes:

a storage unit having, inside the storage unit, the development roller and a stirring member for stirring the replenishment toner, and a replenishment unit connecting the replenishment port and the storage unit and configured to guide the replenishment toner replenished from the replenishment container to the storage unit, and wherein, when viewed in the vertical direction, the fan overlaps a part of the storage unit and does not overlap the replenishment unit.

6. The image forming apparatus according to claim 1, wherein, in the apparatus main body, an exhaust port of the fan is provided below the discharge port in the vertical direction, and the fan is provided below the exhaust port in the vertical direction when the image forming apparatus is placed on a horizontal surface so that the discharge port is disposed above the development device.

7. The image forming apparatus according to claim 6, wherein the duct configured to guide the air taken in by the fan to the exhaust port is provided between the fan and the exhaust port.

8. The image forming apparatus according to claim 1, wherein the fan is configured to take in the air from a direction in which the development device is arranged.

9. The image forming apparatus according to claim 1, wherein the blade extends in the longitudinal direction, and wherein an area provided with the blade extends outward in the longitudinal direction from a width of a recording material having a maximum size which can be conveyed by the image forming apparatus.

10. The image forming apparatus according to claim 1, wherein a plurality of areas, each provided with the blade, is provided in the longitudinal direction, and a rib connects the plurality of areas.

11. The image forming apparatus according to claim 1, wherein a plurality of areas, each provided with the blade, is provided in the longitudinal direction, and the rotating shaft of the fan connects the plurality of areas.

12. The image forming apparatus according to claim 11, wherein each of the plurality of areas is provided with an area duct configured to guide air taken in by the fan to an exhaust port.

13. The image forming apparatus according to claim 11, wherein, in a state where the discharge tray is opened with respect to the apparatus main body, the replenishment port is exposed from the opening, wherein, in a state where the discharge port is closed with respect to the apparatus main body, the replenishment port and the wall are covered by the discharge tray, and wherein the replenishment port is arranged on one end side in the longitudinal direction, and the drive gear is arranged on an other end side in the longitudinal direction.

14. The image forming apparatus according to claim 1, wherein the diameter of the rotational trajectory of the blade is larger than a diameter of the development roller.

* * * * *